United States Patent [19]

Choi

[11] Patent Number: 5,105,128

[45] Date of Patent: Apr. 14, 1992

[54] FOCUSING UNIT

[75] Inventor: Dae-Sung Choi, Anyang, Rep. of Korea

[73] Assignee: Samsung Electro-Mechanics Co., Ltd., Kyungki, Rep. of Korea

[21] Appl. No.: 619,926

[22] Filed: Nov. 28, 1990

[30] Foreign Application Priority Data

Nov. 30, 1989 [KR] Rep. of Korea .............. 89-17951[U]

[51] Int. Cl.5 .................... G09G 1/04; H01C 10/06; H01C 10/30; H01C 19/58

[52] U.S. Cl. .................... 315/382; 338/97; 338/160; 200/11 DA

[58] Field of Search .................... 315/382; 338/96, 97, 338/202, 285, 333, 160, 162; 200/11 R, 11 A, 11 DA, 258, 571, 292, 241

[56] References Cited

U.S. PATENT DOCUMENTS

| 3,909,769 | 9/1975 | Rozema et al. | 338/48 |
| 4,200,780 | 4/1980 | Romano | 338/161 |
| 4,492,950 | 1/1985 | Simovits, Jr. | 338/162 |
| 4,527,147 | 8/1985 | Arakawa | 338/162 |
| 4,631,512 | 12/1986 | Hishiki et al. | 338/48 |
| 4,679,024 | 7/1987 | Kittleson | 338/160 |

*Primary Examiner*—Gregory C. Issing
*Attorney, Agent, or Firm*—Webb, Burden, Ziesenheim & Webb

[57] ABSTRACT

A unit for adjusting the focusing voltage of a cathode ray tube by controlling the high voltage of a flyback transformer comprising a main body unit (400) consisting of an interior face having a rail (402) extending therefrom, a knob (3) journaled in the main body, a variable shaft means (417) connected to turn with the knob, a contact terminal support (412) having a cylindrical protrusion (414) extending through an elongate opening in the variable shaft means, the protrusion having a rail groove (413) therein for sliding over the rail and a contact pin (411) carried by the contact terminal support.

7 Claims, 5 Drawing Sheets

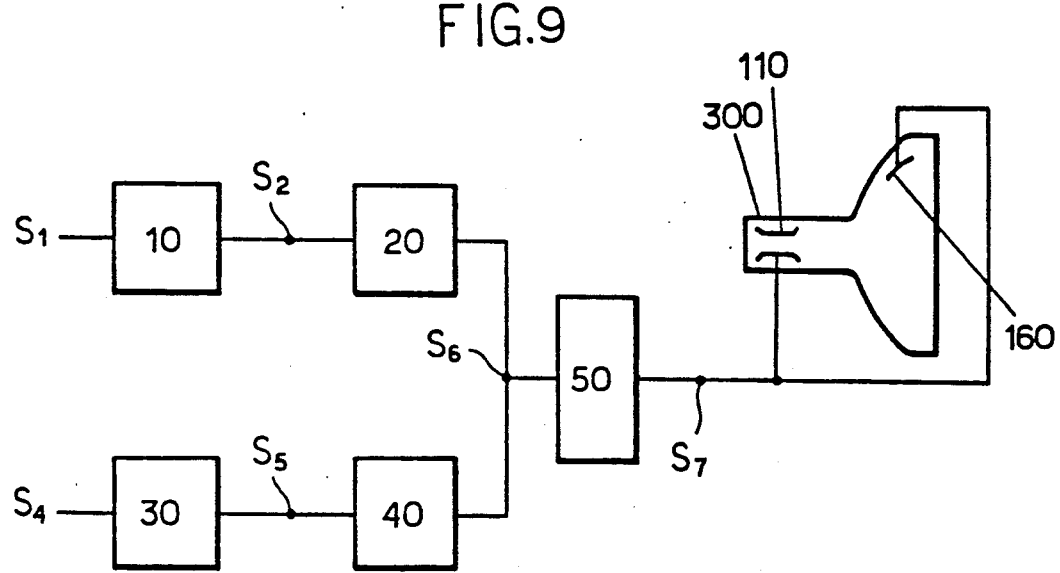

FOCUSING UNIT

BACKGROUND OF THE INVENTION

The present invention relates to a focusing unit for controlling the focusing voltage of a cathode ray tube within a TV receiver by appropriately controlling the high voltage of the FBT (flyback transformer) and, more particularly, to a dynamic focusing unit capable of controlling the peripheral focus in the up and down and the right and left dimensions of the TV screen correctly and over a wider range.

Generally, the focusing unit is a device for focusing the electron beam, being an electrostatic lens formed between anode electrode and cathode electrodes by applying pertinent voltage to the focusing electrodes such that a clear image is displayed on a fluorescent screen by the electron beam emitted from the electron gun of the picture tube.

FIG. 8 is a schematic structural diagram of a picture tube with a spherical screen controlled by the focusing circuit of Korean Utility Model official publication gazette No. 89-8220, and wherein the electrons emitted from cathode 100 of the electron gun are made into an electron beam being radiated to a beam focusing point on a fluorescent screen 130. For focusing this electron beam, focusing electrode 110 is provided within the interior of the picture tube and then pertinent voltage is applied from the exterior. Thereby, the electron beam is focused by the electrostatic field of focusing electrode 110.

However, although the electron beam focused upon the fluorescent screen 130 of the aforementioned spherical picture tube does not produce deviation, in the case when the fluorescent screen 130 is flat as the picture screen 140, a focusing deviation 150 is produced at the peripheral regions of the flat screen.

Accordingly, since the conventional focusing device was a device designed for a spherical cathode ray tube, a focusing deviation has been produced at the peripheral region of the flat cathode ray tube.

In order to solve the above-described defect, a device has been developed in which focusing is correctly controlled at peripheral regions of cathode ray tubes by utilizing the horizontal flyback pulse signal and vertical output signal.

As shown in FIG. 9, a focusing device for controlling the electron beam to be focused on the flat screen of cathode ray tube 300 in response to the signal applied to focusing electrode 110 comprises a vertical signal integrating circuit 10 for integrating vertical pulse signal $S_1$, thereby converting to a vertical parabolic waveform signal $S_2$, a vertical amplifying circuit 20 for variably amplifying the output signal of said vertical signal integrating circuit 10, thereby controlling the up and down focusing on the screen, a horizontal signal integrating circuit 30 for integrating the horizontal pulse signal $S_4$ inputted after being extracted from the flyback transformer, thereby converting to a horizontal parabolic waveform signal $S_5$, a buffer circuit 40 for variably current amplifying the output signal of said horizontal signal integrating circuit, thereby controlling the right and left focusing on the screen, and an inversion amplifying circuit 50 for inversely amplifying the mixed vertical and horizontal parabolic waveform signals $S_6$. The signal $S_7$ outputted from said inversion amplifying circuit 50 is applied to focusing electrode 110 of picture tube 300 and also to anode 160 of picture tube 300.

These elements are arranged so that the phenomenon of deviating focus at peripheral regions of the screen is prevented. The focusing unit serves a function which controls appropriately the high voltage coming out of the flyback transformer (FBT) thereby controlling the focus of the cathode ray tube within the TV receiving set.

However, there are many kinds of cathode ray tubes and different focusing voltages are required by each kind. In order to feed focusing voltage of the cathode ray tube for each kind, the wider the variable range of the voltage of the focusing unit is, the better.

A conventional focusing unit is shown in FIGS. 6 and 7 and comprises a knob 208 passing through hole 201 in the rectangular main body 200 of the focusing unit having annular ring 204 protruded with two rotation limiting protrusions 202, 203 extending inward, contact terminal fixing means 206 having a horseshoe shape to receive variable contact pin 205, knob body 210 structured with variable shaft means 207 formed integrally with said fixing means 206 as well as knob 208, and ceramic base board 230 provided with input and output voltage terminals 231, 232, circular printed portion 233 and bent printed portion 234.

However, in this conventional focusing unit, since variable contact pin 205 is moved along circular printed portion 233 around knob 208, the extent of the output voltage terminal 231 from the input voltage 25 terminal 232 is limited within a narrow range.

Therefore, since it has a simple structure that the first focusing voltage variable range 240 cannot cover by less than 10%–15% and also the second focusing voltage variable range 250 cannot cover by less than 2%–3%, there has been a problem of achieving a satisfactory variable voltage focusing range.

SUMMARY OF THE INVENTION

The present invention overcomes the aforementioned various problems. It is an object of the present invention to provide a focusing unit in which a variable voltage feeding range for a focusing unit is made to be operated over a wide range so that various kinds of cathode ray tubes can be accommodated with one model of a focusing unit, and at the same time, since the distance between the variable resistor pattern printed portion and the shortest resistor pattern printed portion of the moving range is controlled voluntarily, the maximum withstand voltage is raised so that the high voltage of the output stage can be maintained by a unit of small size.

The present invention is characterized in that it comprises a main body of the focusing unit provided with a rail having a plurality of bent portions, a knob-body provided with contact terminal support means protruded with a circular protrusion defined with a rail groove larger than the width of said rail in which a plate spring is mounted into said rail groove. The protrusion is inserted into an oval hole in said ceramic base board printed with input and output voltage terminals and resistor pattern printed portion, so that variable range of feeding voltage from flyback transformer (FBT) is widely controlled.

The foregoing and other objects as well as advantages of the present invention will become clear by the following description of the invention with reference to the accompanying drawings.

BRIEF DESCRIPTION OF THE DRAWING

For a better understanding of the invention, and to show how the same may be carried into effect, reference will now be made, by way of example, to the accompanying drawings, in which:

FIG. 9 is a block diagram of circuit for controlling an existing focusing unit.

Throughout the drawings, like reference numerals and symbols are used for designating like or equivalent parts or portions for simplicity of illustration and explanation.

DETAILED DESCRIPTION OF THE INVENTION

Figure 1:
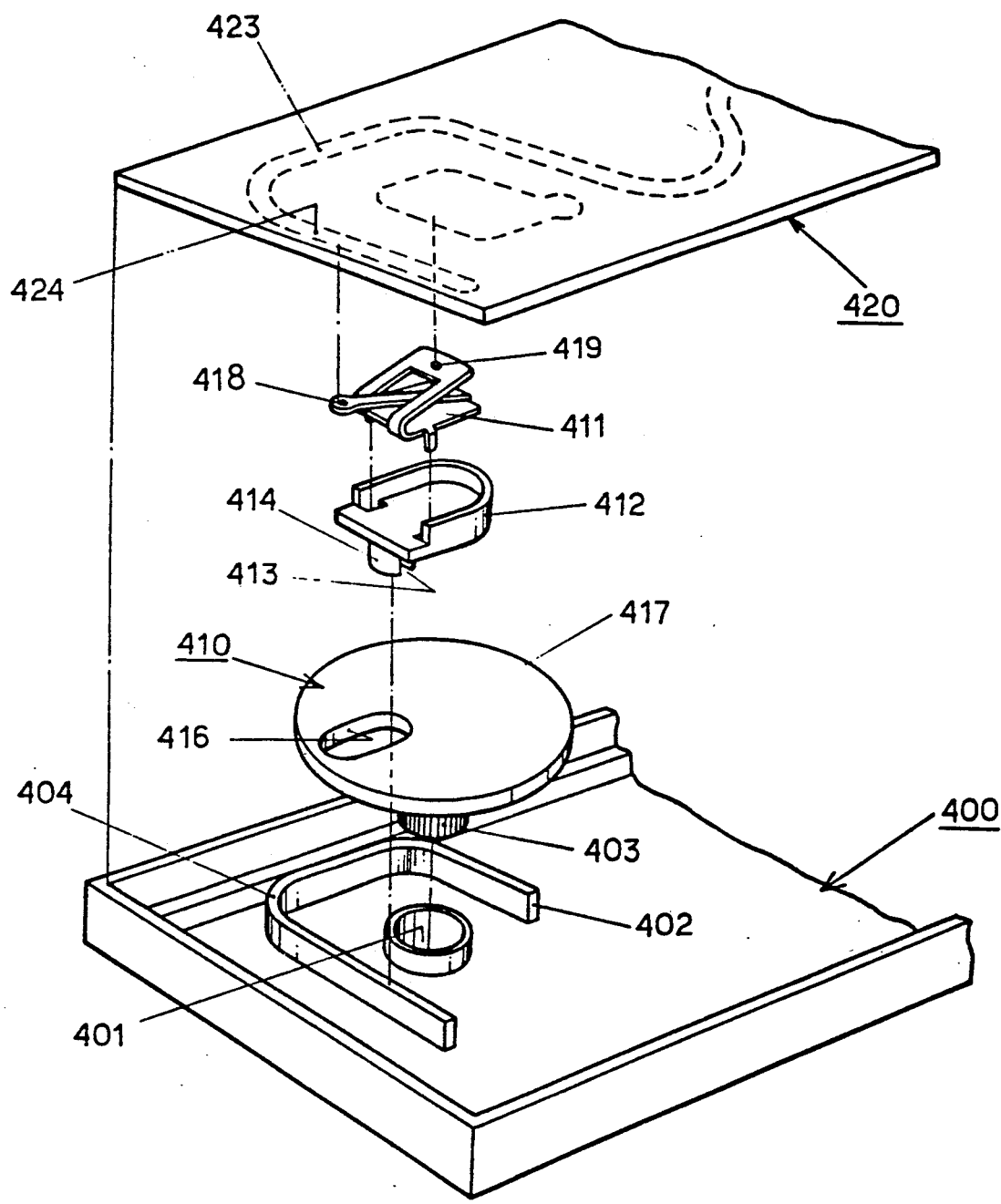
FIG. 1 is an exploded magnified perspective view of the essential part of the focusing unit of the present invention.
Figure 2:
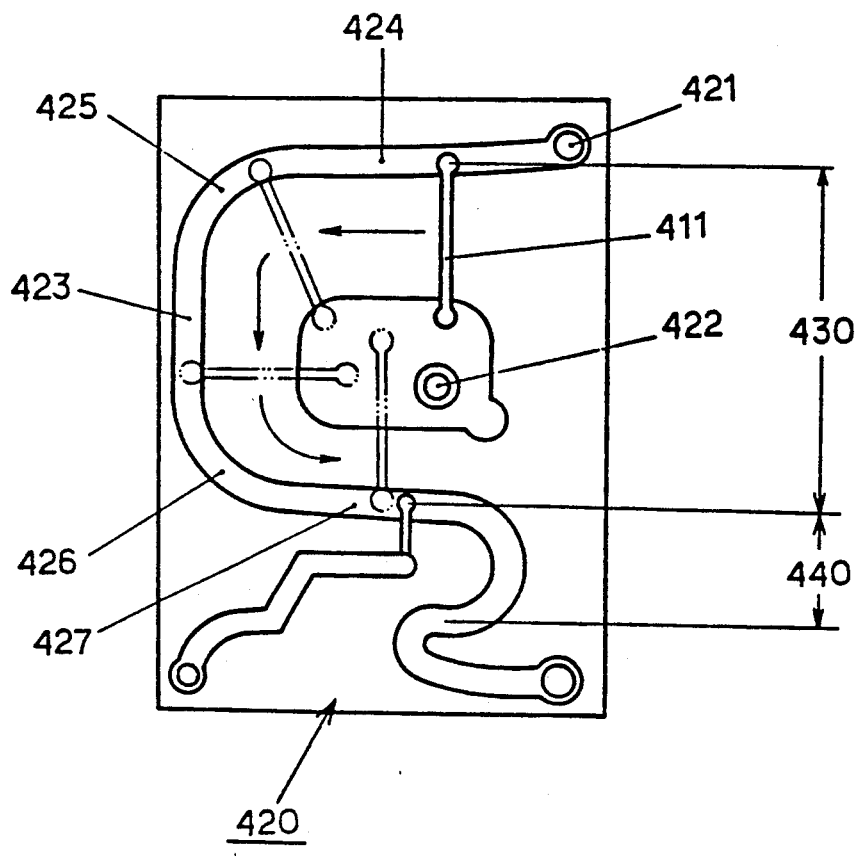
FIG. 2 is a diagram for showing printed resistor pattern on the ceramic base board used for the focusing unit of the present invention.
Figure 3:
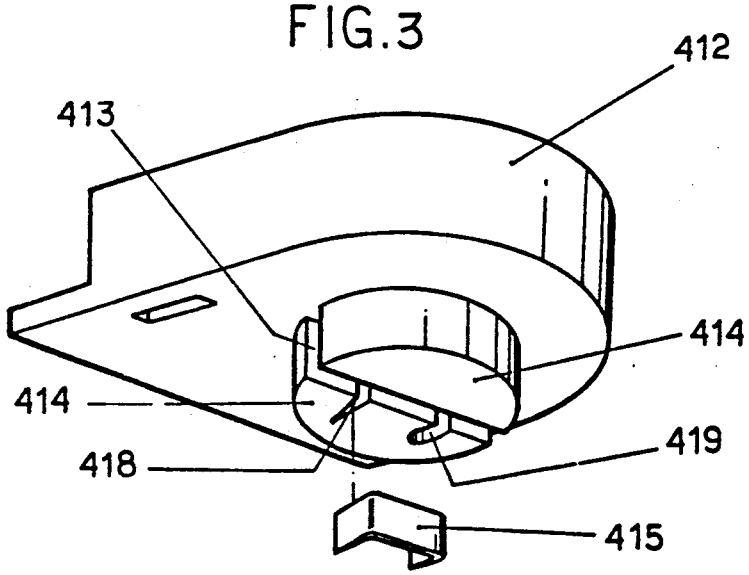
FIG. 3 is a perspective view of contact terminal fixing means of the present invention.

Hereinafter, a preferred embodiment of the present invention will be described in detail with reference to the accompanying drawings.

The present invention illustrated in FIGS. 1 to 5 comprises focusing unit main body 400, knob-body 410 and ceramic base board 420.

Said focusing unit main body 400 is provided with knob 403 passing through hole 401 and rail 402 having a plurality of bent portions 404. Integral with said knob 403 is knob-body 410 which carries contact terminal fixing means 412 having a horseshoe shape and itself carrying variable contact pin 411. Cylindrical protrusion 414 extending from said terminal fixing means is provided, with rail groove 413 a little wider than the width of said rail 402. Plate spring 415 (see FIG. 3) is bent at both ends and is provided in said rail groove 412. Variable shaft means 417 integrally formed with knob 403 is provided with perforated elongate opening 416 which receives cylindrical protrusion 414. The knob 3 and variable shaft means 417 rotate together and comprise the knob body.

Both end portions of said plate spring 415 are bent into a slant shape ("∧"). The first groove 418' of the circular protrusion for receiving one end of said plate spring 415 is formed in a slant shape ("∧"), and the second groove 419' of said circular protrusion 414 is formed in a semicircular shape ("∩") whereby said plate spring 415 is easily deformed.

The ceramic base board 420 is made with an electrically conducting structure printed thereon with input and output voltage terminals 421, 422, and resistor pattern portion 423 therebetween. Said resistor pattern printed portion 423, 424, 427 of the ceramic base board 420 is a resistor pattern printed portion having a "⊏" shape with sharply bent portions 425, 426 at both sides.

Operation and effect of a preferred embodiment according to the present invention constituted as above will be described in detail hereinafter.

According to the present invention, as shown in FIGS. 1 to 5, when the knob 403 and variable shaft means 417 are turned in order to adjust the predetermined focus voltage, the variable contact pin 411, carried by support means 412 having cylindrical protrusion 414 which in turn rides rail 402 via rail groove 413, is variably moved along in contact with the resistor pattern.

The variable movement of said rail groove makes variable movement of the circular protrusion to be possible within elongate opening 416 of the variable shaft means 417.

The rail groove 413 of said cylindrical protrusion 414 is variably moved along said rail 402 and simultaneously first contact means 418' of said variable contact pin 411 is variably moved along the resistor pattern printed portion 423 of said ceramic base board 420, and second contact means 419' of said variable contact pin 411 is variably moved by contacting to basic pattern printed portion of said ceramic base board 420. When passing the bent portion 404 of the rail, the rail groove becomes as shown in FIG. 4.

Figure 4:
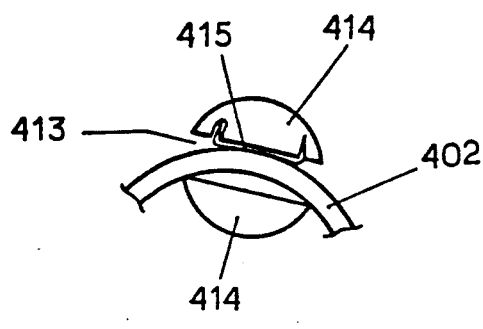
FIG. 4 is a diagram for illustrating a state when the rail groove of the contact terminal fixing means passes a curved rail section according to the present invention.
Figure 5:
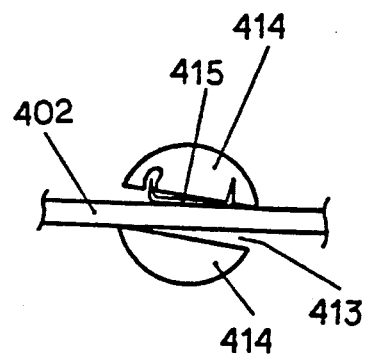
FIG. 5 is a diagram for illustrating a state when the rail groove of the contact terminal fixing means passes a linear rail section according to the present invention.

As shown in said FIG. 4, the first contact means 418' of the variable contact pin 411 contacts the sharply bent portions 425, 426, and when passing along the straight portion of the rail 402, the plate spring 415 supports the rail 402.

A first focusing voltage variable range 430 between one end printed portion 424 of said resistor pattern printed portion 423 and other end printed portion 427 is a variable range having a potential difference of 30%-35% of maximum. A second focusing voltage variable range 440 is a variable range having a potential difference of 10%-15% of maximum.

According to the present invention constituted as above, different from conventional focusing unit, since the variable range is wider by providing the focusing unit main body 400, knob-body 410 and ceramic base board 420, various kinds of cathode ray tubes can be controlled by one model. Since the distance between the variable resistor pattern printed portion 423 and the shortest resistor printed portion 424 of the moving range is controlled voluntarily, not only is the withstand voltage raised in maximum, but also the manufacturing cost is reduced because the high voltage of the output stage can be maintained by a small size.

It will be appreciated that the present invention is not restricted to the particular embodiment that has been described hereinbefore, and that variations and modifications may be made therein without departing from the spirit and scope of the invention as defined in the appended claims and equivalents thereof.

I claim:

1. A unit for adjusting the focusing voltage of a cathode ray tube by controlling the high voltage of a flyback transformer comprising:

a) a main body unit (400) consisting of an interior face having a rail (402) extending therefrom having substantially straight sections and a curved section therebetween;

b) a knob-body (410) journaled in the main body for rotation relative thereto about an axis of rotation and a variable shaft means (417) connected to turn with the knob, said variable shaft means having an elongate opening (416) therein;

c) a contact terminal supporting means (412) for sliding over the rail dependent upon the movement of the elongate opening (416);

d) a ceramic base board (420) having an interior face opposite the interior face of the main body unit and a resistive ribbon (423) printed on the interior face of the base board; and e) a variable contact pin (411) variably movable along the resistive ribbon (423) of said ceramic base board (420) as it is carried by the contact terminal supporting means.

2. A unit according to claim 1, wherein the shape of said rail (402) corresponds to the shape of said resistive ribbon and said ribbon is constructed with a plurality of curved portions (425, 426) and a plurality of linear portions (423, 424, 427).

3. A unit according to claim 2, wherein the contact terminal supporting means (412) comprises a cylindrical protrusion (414) extending through the elongate opening (416) in the variable shaft means (417), said protrusion having a rail groove (413) therein a little wider than the rail for sliding over the rail.

4. A unit according to claim 3, wherein within the rail groove (413) a plate spring (415) is provided for biasing the contact terminal supporting means relative to the rail.

5. A unit according to claim 4, wherein the plate spring (415) has a " ⊏ " shape and its ends both have " ∧ " shapes.

6. A unit according to claim 3, wherein the circular protrusion (414) defined with rail groove (413) is provided with said plate spring formed with a " ∧ " shape at its one end and a " ∩ " shape at the other end, so that the plate spring may be easily deformed.

7. A unit according to claim 3, wherein as the circular protrusion (414) defined with said rail groove (413) and passed through the elongate opening (416) and connected to the rail (402), passes the two curved portions of said resistive ribbon printed portion, it moves to one end of said elongate opening, and as it passes three linear portions of said resistive ribbon printed portion, it moves to the other end of said elongate opening.

* * * * *

UNITED STATES PATENT AND TRADEMARK OFFICE
CERTIFICATE OF CORRECTION

PATENT NO. : 5,105,128
DATED : April 14, 1992
INVENTOR(S) : Dae-Sung Choi

Figure 6:
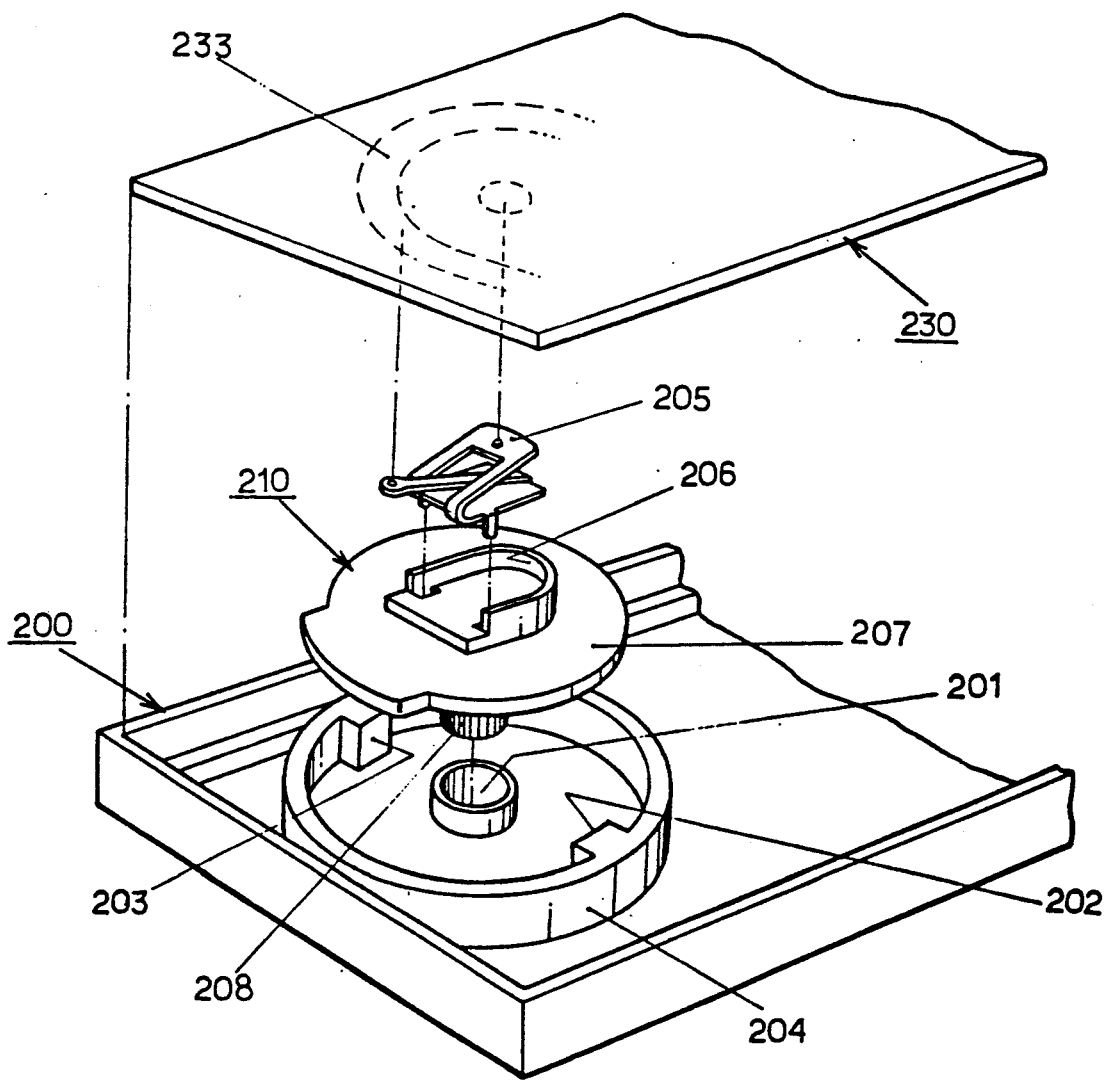
FIG. 6 is an exploded perspective view of conventional focusing unit.
Figure 7:
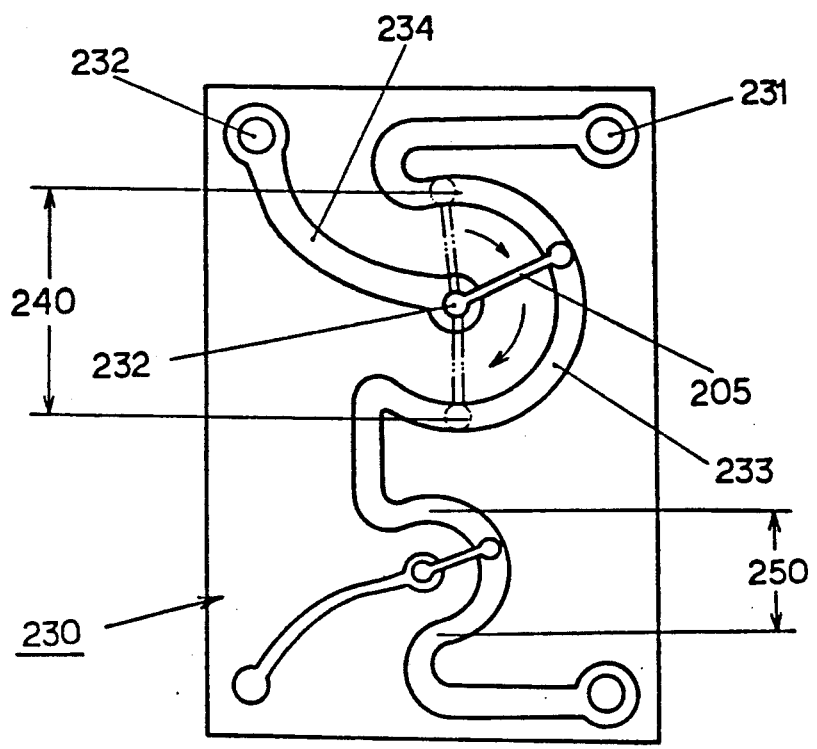
FIG. 7 is a diagram of printed resistor pattern of ceramic base board used for conventional focusing unit.
Figure 8:
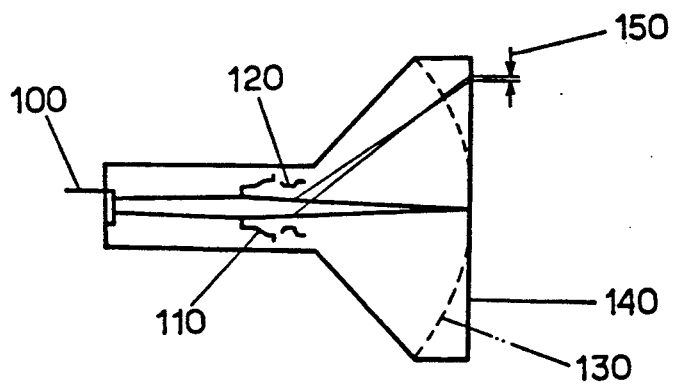
FIG. 8 is a schematic diagram of picture tube structure with a screen controlled by a conventional focusing unit.

It is certified that error appears in the above-identified patent and that said Letters Patent is hereby corrected as shown below:

In Fig. 1 "418" should read --418'--
In Fig. 1 "419" should read --419'--.
Fig. 6 should be labeled "Prior Art".
Fig. 7 should be labeled "Prior Art".

Title page:   [75] Inventor "Anyang" should read --Anyang-Si--
       and after [73] Assignee "Kyungki" should read --Kyungki-Do--.

Column 2 Line 29 "voltage 25" should read --voltage--.

Column 3 Line 1 "DRAWING" should read --DRAWINGS--.

Signed and Sealed this

Thirteenth Day of July, 1993

Attest:

MICHAEL K. KIRK

*Attesting Officer*        *Acting Commissioner of Patents and Trademarks*